US011738655B2

(12) United States Patent
Ando

(10) Patent No.: US 11,738,655 B2
(45) Date of Patent: Aug. 29, 2023

(54) VEHICLE

(71) Applicant: TOYOTA JIDOSHA KABUSHIKI KAISHA, Toyota (JP)

(72) Inventor: Toru Ando, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/741,996

(22) Filed: May 11, 2022

(65) Prior Publication Data

US 2022/0266711 A1 Aug. 25, 2022

Related U.S. Application Data

(63) Continuation of application No. 17/164,064, filed on Feb. 1, 2021, now Pat. No. 11,358,485.

(30) Foreign Application Priority Data

Feb. 4, 2020 (JP) .................................. 2020-016815

(51) Int. Cl.
*B60L 53/60* (2019.01)
*B60L 53/16* (2019.01)

(52) U.S. Cl.
CPC .............. *B60L 53/60* (2019.02); *B60L 53/16* (2019.02)

(58) Field of Classification Search
CPC ................................ B60L 53/60; B60L 53/16
USPC ........................................................ 320/109
See application file for complete search history.

(56) References Cited

U.S. PATENT DOCUMENTS

| 10,259,328 | B2 * | 4/2019 | Hayashizaki | ........... B60L 58/14 |
| 2009/0085522 | A1 * | 4/2009 | Matsumoto | ........... B60W 10/26 |
| | | | | 320/137 |
| 2009/0091291 | A1 * | 4/2009 | Woody | ...................... H02J 3/14 |
| | | | | 701/2 |
| 2009/0289594 | A1 * | 11/2009 | Sato | .......................... H02J 7/35 |
| | | | | 320/101 |
| 2010/0033140 | A1 * | 2/2010 | Otake | ..................... B60L 53/22 |
| | | | | 320/165 |

(Continued)

FOREIGN PATENT DOCUMENTS

| CN | 107128178 A | 9/2017 |
| CN | 108725244 A | 11/2018 |

(Continued)

*Primary Examiner* — Suresh Memula
(74) *Attorney, Agent, or Firm* — Dinsmore & Shohl LLP

(57) ABSTRACT

A vehicle includes a charging stop switch that accepts a stopping operation for stopping external charging, and an ECU that stops the external charging when the stopping operation is accepted at the charging stop switch. The ECU determines whether or not a specific operation different from the stopping operation at the charging stop switch has been accepted, and when it is determined that the specific operation has been accepted, disables acceptance of the stopping operation. The specific operation is an operation different from an intended operation of a prescribed subject. The vehicle includes an inlet to which a charging connector for external charging can be connected. The ECU detects connection of the charging connector to the inlet, the prescribed subject is the charging connector, and the specific operation is a prescribed number of operations of connecting and disconnecting the prescribed subject within a prescribed time period.

5 Claims, 9 Drawing Sheets

(56) References Cited

U.S. PATENT DOCUMENTS

| | | | | |
|---|---|---|---|---|
| 2011/0022222 | A1* | 1/2011 | Tonegawa | B60L 8/003 320/109 |
| 2011/0258112 | A1* | 10/2011 | Eder | B60L 53/65 320/109 |
| 2012/0049796 | A1* | 3/2012 | Fukatsu | H02J 7/0042 320/109 |
| 2012/0091954 | A1* | 4/2012 | Matsuki | B60L 3/04 320/109 |
| 2012/0161692 | A1* | 6/2012 | Kobayashi | B60L 58/13 320/109 |
| 2012/0274276 | A1* | 11/2012 | Endo | B60R 25/2018 320/109 |
| 2013/0049695 | A1* | 2/2013 | Baba | H02J 3/12 320/128 |
| 2013/0088200 | A1* | 4/2013 | Kamishima | B60L 3/04 320/109 |
| 2014/0062419 | A1* | 3/2014 | Kasaya | B60L 3/0069 320/160 |
| 2015/0329002 | A1* | 11/2015 | Broecker | B60L 53/65 320/109 |
| 2015/0375633 | A1 | 12/2015 | Masuda | |
| 2016/0380440 | A1* | 12/2016 | Coleman, Jr. | G05F 1/66 700/295 |
| 2018/0236888 | A1* | 8/2018 | Yabuuchi | B60L 3/04 |
| 2020/0122597 | A1* | 4/2020 | Ichikawa | B60L 53/11 |
| 2020/0231045 | A1* | 7/2020 | Shin | B60L 15/20 |
| 2020/0298722 | A1* | 9/2020 | Smolenaers | H02J 7/345 |

FOREIGN PATENT DOCUMENTS

| | | | | |
|---|---|---|---|---|
| CN | 111086402 | A | 5/2020 | |
| CN | 111086402 | A * | 5/2020 | B60H 1/00971 |
| CN | 113561830 | A * | 10/2021 | |
| EP | 2842793 | A1 * | 3/2015 | B60L 3/00 |
| EP | 2958222 | A1 | 12/2015 | |
| EP | 2958222 | A1 * | 12/2015 | B60L 53/11 |
| EP | 3321121 | A2 * | 5/2018 | B60L 50/15 |
| EP | 3321121 | A2 | 5/2018 | |
| EP | 3643554 | A1 * | 4/2020 | B60H 1/00971 |
| EP | 3699013 | A2 | 8/2020 | |
| EP | 3699013 | A2 * | 8/2020 | B60L 3/00 |
| GB | 2597739 | A * | 2/2022 | B60L 53/64 |
| JP | 2013-188051 | A | 9/2013 | |
| JP | 2014-166051 | A | 9/2014 | |
| JP | 2014-241670 | A | 12/2014 | |
| KR | 20210050499 | A | 5/2021 | |
| KR | 20210050499 | A * | 5/2021 | |
| WO | WO-2018037260 | A1 * | 3/2018 | B60L 53/31 |

* cited by examiner

FIG.2
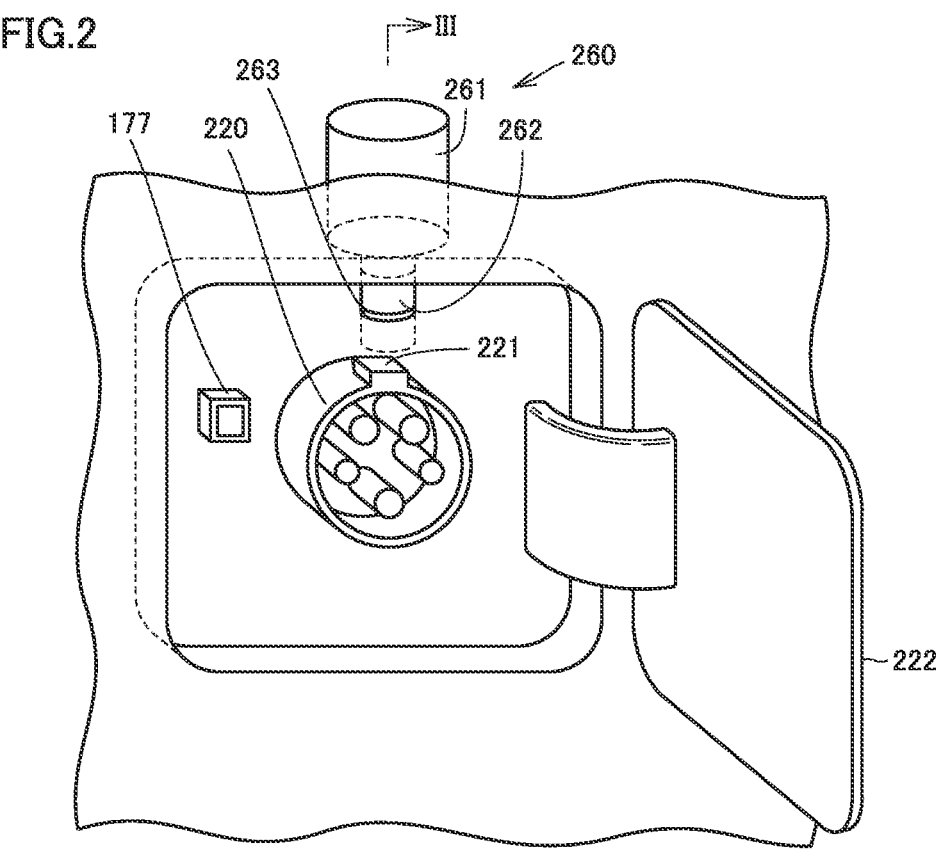
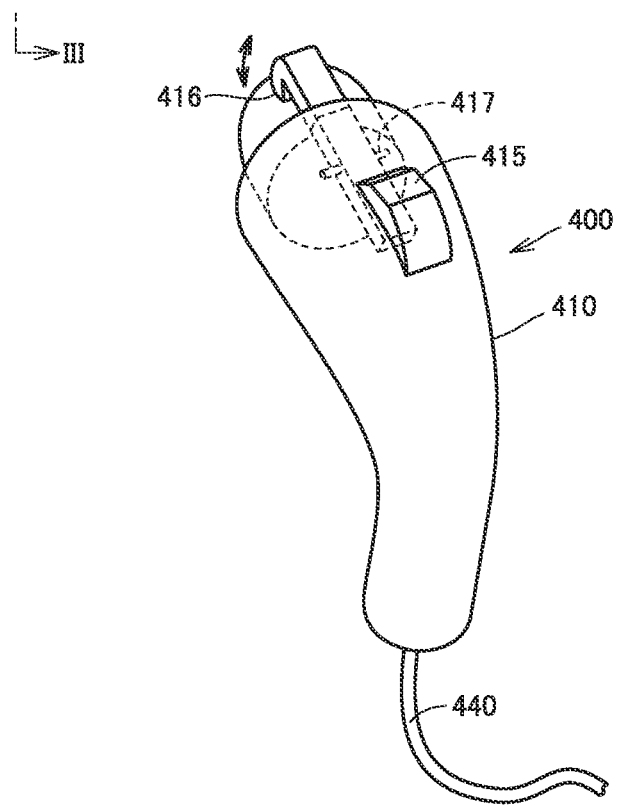

VEHICLE

CROSS REFERENCE TO RELATED APPLICATIONS

This nonprovisional application is a continuation application of U.S. patent application Ser. No. 17/164,064 filed Feb. 1, 2021, which claims priority to Japanese Patent Application No. 2020-016815 filed on Feb. 4, 2020 with the Japan Patent Office, the entire contents of which are hereby incorporated by reference.

BACKGROUND

Field

The present disclosure relates to a vehicle, and particularly to a vehicle capable of external charging in which a vehicle-mounted power storage device is externally charged.

Description of the Background Art

Conventionally, a device is known in which exchange of electric power is stopped when an emergency stop switch is operated by a user (for example, see Japanese Patent Laying-Open No. 2013-188051).

SUMMARY

In the device of Japanese Patent Laying-Open No. 2013-188051, however, if the emergency stop switch fails while in the state where exchange of electric power is stopped, electric power cannot be exchanged when so desired.

The present disclosure has been made to solve the problem described above, and has an object to provide a vehicle that can be charged even in the event of a failure of an operation unit that accepts an operation of stopping charging.

A vehicle according to the present disclosure is a vehicle capable of external charging in which a vehicle-mounted power storage device is externally charged. The vehicle includes a stopping operation unit that accepts a stopping operation for stopping the external charging, and a controller that stops the external charging when the stopping operation is accepted at the stopping operation unit. If a specific operation different from the stopping operation at the stopping operation unit is accepted, the controller disables acceptance of the stopping operation.

With such a configuration, if the specific operation different from the stopping operation for stopping the external charging is accepted, acceptance of the stopping operation by the stopping operation unit is disabled. As a result, a vehicle can be provided that is capable of external charging even in the event of a failure of a stopping operation unit that accepts a stopping operation for stopping the external charging.

The specific operation may be an operation different from an intended operation of a prescribed subject. With such a configuration, when it is determined that the specific operation different from the intended operation of the prescribed subject has been accepted, acceptance of the stopping operation by the stopping operation unit is disabled. Thus, the specific operation can be accepted as an operation of a prescribed subject already provided in the vehicle. As a result, the specific operation can be accepted without the need to provide a special component.

The vehicle may further include an inlet to which a charging connector for external charging can be connected, and a detector that detects connection of the charging connector to the inlet. The prescribed subject is the charging connector. The specific operation may be a prescribed number of operations of connecting and disconnecting the prescribed subject within a prescribed time period.

With such a configuration, when it is determined that the prescribed number of operations of connecting and disconnecting the charging connector within the prescribed time period has been accepted as the specific operation, acceptance of the stopping operation by the stopping operation unit is disabled. Thus, the specific operation can be accepted as an operation of the charging connector already provided in the vehicle. As a result, the specific operation can be accepted without the need to provide a special component.

The vehicle may further include an inlet to which a charging connector for external charging can be connected, a latch mechanism that achieves a latched state where the charging connector connected to the inlet is not removed, and a releasing operation unit that accepts a releasing operation for releasing the latched state by the latch mechanism. The prescribed subject may be the releasing operation unit. The specific operation may be a prescribed number of the releasing operations of the prescribed subject within a prescribed time period.

With such a configuration, when it is determined that the prescribed number of releasing operations of the releasing operation unit within the prescribed time period has been accepted as the specific operation, acceptance of the stopping operation by the stopping operation unit is disabled. Thus, the specific operation can be accepted as an operation of the releasing operation unit already provided in the vehicle. As a result, the specific operation can be accepted without the need to provide a special component.

The vehicle may further include an inlet to which a charging connector for external charging can be connected, a lock mechanism that switches between a locked state and an unlocked state, the charging connector connected to the inlet being not removed in the locked state, and the charging connector connected to the inlet being capable of being removed in the unlocked state, and a switching operation unit that accepts a switching operation between the locked state and the unlocked state by the lock mechanism. The prescribed subject may be the switching operation unit. The specific operation may be a prescribed number of the switching operations of the prescribed subject within a prescribed time period.

With such a configuration, when it is determined that the prescribed number of switching operations of the switching operation unit within the prescribed time period has been accepted as the specific operation, acceptance of the stopping operation by the stopping operation unit is disabled. Thus, the specific operation can be accepted as an operation of the switching operation unit already provided in the vehicle. As a result, the specific operation can be accepted without the need to provide a special component.

The foregoing and other objects, features, aspects and advantages of the present disclosure will become more apparent from the following detailed description of the present disclosure when taken in conjunction with the accompanying drawings

BRIEF DESCRIPTION OF THE DRAWINGS

FIG. 2 shows the structure of and around an inlet, and the structure of a charging cable.

DETAILED DESCRIPTION

Figure 1:
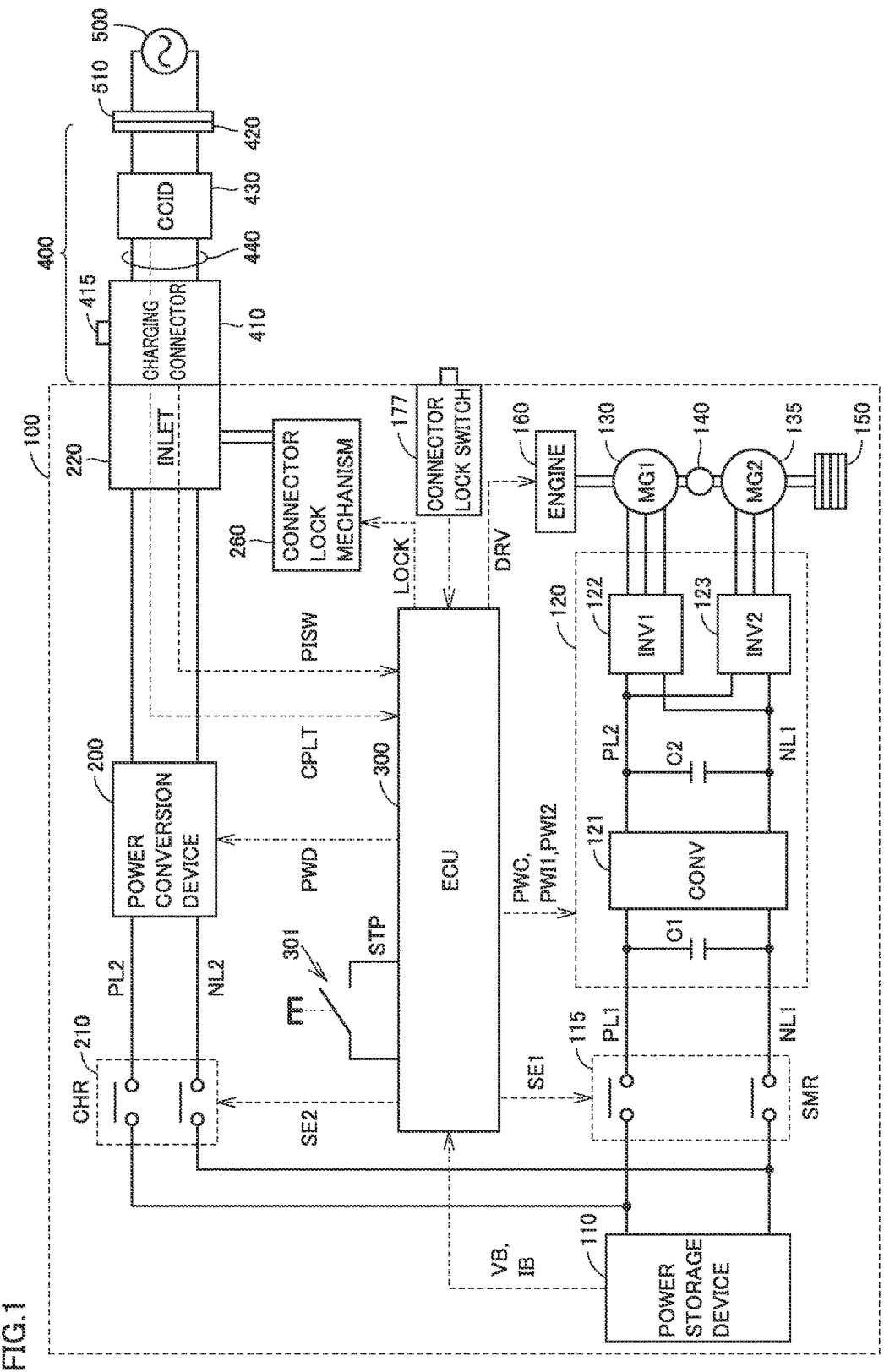
FIG. 1 is an overall block diagram of an externally chargeable vehicle in the present embodiment.

Hereinafter, embodiments of the present disclosure will be described in detail with reference to the drawings. The same or corresponding parts are denoted by the same reference numbers in the drawings, and the description thereof will not be repeated.

[Description of Charging System]

FIG. 1 is an overall block diagram of an externally chargeable vehicle in the present embodiment. Referring to FIG. 1, a vehicle 100 is a vehicle capable of external charging in which a vehicle-mounted power storage device 110 is externally charged, for example, a hybrid vehicle. Vehicle 100 includes power storage device 110, a system main relay (SMR) 115, a PCU (Power Control Unit) 120 serving as a driving device, motor generators 130, 135, a power transmission gear 140, driving wheels 150, an engine 160 serving as an internal combustion engine, and an ECU (Electronic Control Unit) 300 serving as a control device. PCU 120 includes a converter 121, inverters 122, 123, and capacitors C1, C2.

Power storage device 110 is an electric power storage component configured to be chargeable and dischargeable. Power storage device 110 includes, for example, a secondary battery such as a lithium-ion battery, a nickel-metal hydride battery or a lead-acid battery, or a power storage element such as an electric double layer capacitor.

Power storage device 110 is connected to PCU 120 via power lines PL1, NL1. Power storage device 110 supplies electric power to PCU 120 for generating driving force of vehicle 100. Power storage device 110 also stores electric power generated at motor generators 130, 135. Power storage device 110 provides output of approximately 200 V, for example.

Power storage device 110 includes a voltage sensor and a current sensor, neither of which are shown, and outputs a voltage VB and a current IB of power storage device 110, detected by these sensors, to ECU 300.

SMR 115 includes a relay connected to a positive terminal of power storage device 110 and power line PL1, and a relay connected to a negative terminal of power storage device 110 and power line NL1. Based on a control signal SE1 from ECU 300, SMR 115 switches between supply and cut-off of electric power between power storage device 110 and PCU 120.

Based on a control signal PWC from ECU 300, converter 121 performs voltage conversion between power lines PL1, NL1 and a power line PL2, power line NL1.

Inverters 122, 123 are connected in parallel with power line PL2 and power line NL1. Based on control signals PWI1, PWI2 from ECU 300, respectively, inverters 122, 123 convert DC power supplied from converter 121 into AC power to drive motor generators 130, 135, respectively.

Capacitor C1 is provided between power line PL1 and power line NL1, and reduces voltage variation between power line PL1 and power line NL1. Capacitor C2 is provided between power line PL2 and power line NL1, and reduces voltage variation between power line PL2 and power line NL1.

Motor generators 130, 135 are each an AC rotating electrical machine, for example, a permanent-magnet type synchronous motor including a rotor having a permanent magnet embedded therein.

Output torque from motor generators 130, 135 is transmitted to driving wheels 150 via power transmission gear 140 including a speed reducer and a power split device, to allow travel of vehicle 100. Motor generators 130, 135 can generate electric power by rotational force of driving wheels 150 during regenerative braking operation of vehicle 100. The electric power thus generated is then converted by PCU 120 into electric power for charging power storage device 110.

Motor generators 130, 135 are also coupled to engine 160 via power transmission gear 140. Motor generators 130, 135 and engine 160 are cooperatively controlled by ECU 300, to generate required driving force of the vehicle. Further, motor generators 130, 135 can generate electric power by rotation of engine 160, and this generated electric power can be used to charge power storage device 110. In the present embodiment, motor generator 135 is exclusively used as a motor for driving driving wheels 150, while motor generator 130 is exclusively used as a power generator driven by engine 160.

While two motor generators are provided in the example of FIG. 1, the number of motor generators is not limited as such. One motor generator, or two or more motor generators may be provided.

FIG. 2 shows the structure of and around an inlet 220, and the structure of a charging cable 400. Referring to FIGS. 1 and 2, vehicle 100 includes, as a configuration for charging power storage device 110 with electric power from an external power supply 500, a power conversion device 200, a charge relay (CHR) 210, inlet 220 serving as a connection portion, a connector lock mechanism 260, a connector lock switch 177, a charging stop switch 301, and a charging lid 222.

Charging lid 222 is configured to be openable and closable, and covers inlet 220 and connector lock switch 177 when closed. When charging lid 222 is opened, a charging connector 410 of charging cable 400 can be connected to inlet 220, and connector lock switch 177 can be operated.

When charging connector 410 of charging cable 400 is connected to inlet 220, electric power from external power supply 500 can be transmitted to power storage device 110 of vehicle 100 through charging cable 400. Charging of power storage device 110 with electric power from external power supply 500 will be hereinafter referred to as external charging.

Connector lock mechanism 260 mechanically locks charging connector 410 so that charging connector 410 is not removed from inlet 220. Connector lock switch 177 is an operation unit that accepts a user's operation for locking or unlocking connector lock mechanism 260, and is provided in the vicinity of inlet 220. When charging connector 410 is inserted into inlet 220, an operation signal is input to a CPU 310 of ECU 300 every time connector lock switch 177 is operated. In response to this operation signal from connector lock switch 177, the CPU 310 outputs to connector lock mechanism 260 a LOCK signal for switching between the locking and unlocking of connector lock mechanism 260. In response to the LOCK signal, connector lock mechanism 260 switches between the locking and unlocking of charging connector 410. The operations of connector lock switch 177 for locking and unlocking connector lock mechanism 260 will be hereinafter referred to as a locking operation and an unlocking operation, respectively.

Charging cable 400 includes, in addition to charging connector 410, a plug 420 for connection to an outlet 510 of external power supply 500, and a cable portion 440 that connects charging connector 410 and plug 420. In the middle of cable portion 440, a charging circuit interrupt device (CCID) 430 for switching between supply and cut-off of electric power from external power supply 500 is provided.

Power conversion device 200 is connected to inlet 220 via power lines ACL1, ACL2. Power conversion device 200 is connected to power storage device 110 through CHR 210 by power line PL2 and a power line NL2.

Power conversion device 200 is controlled by a control signal PWD from ECU 300, and converts AC power supplied from inlet 220 into DC power for charging power storage device 110. Power conversion device 200 can also convert DC power from power storage device 110 or DC power generated by motor generators 130, 135 and converted at PCU 120 into AC power, and feed the AC power to the outside of the vehicle. Power conversion device 200 may be a single device capable of bidirectional power conversion for charging and power feeding, or may include a device for charging and a device for power feeding as individual devices.

CHR 210 is controlled by a control signal SE2 from ECU 300, and switches between supply and cut-off of electric power between power conversion device 200 and power storage device 110.

ECU 300 includes the CPU (Central Processing Unit) 310, a storage device and an input/output buffer, none of which are shown in FIG. 1. ECU 300 inputs signals from the various sensors and the like and outputs control signals to the various devices, and controls the devices of power storage device 110 and vehicle 100. These types of control can be processed not only by software but also by dedicated hardware (electronic circuitry).

ECU 300 calculates an SOC (State of Charge) of power storage device 110 based on detected values of voltage VB and current IB from power storage device 110.

ECU 300 receives a signal PISW indicating a connected state of charging cable 400 from charging connector 410. ECU 300 also receives a pilot signal CPLT from CCID 430 of charging cable 400. ECU 300 performs charging operation based on these signals, as will be described later in FIG. 5. ECU 300 also controls engine 160 by a control signal DRV.

When charging stop switch 301 is turned on by the user, ECU 300 receives a signal STP for stopping the charging. Upon receiving signal STP, ECU 300 performs control for stopping the external charging.

While a single control device is provided as ECU 300 in FIG. 1, an individual control device may be provided for each function or for each device to be controlled, such as a control device for PCU 120 and a control device for power storage device 110.

Vehicle 100 further includes the connector lock mechanism 260 and a pressing force detection sensor 263. Connector lock mechanism 260 is provided above inlet 220 (in the vicinity of inlet 220). Connector lock mechanism 260 is configured to switch between the locked state where charging cable 400 cannot be removed from inlet 220 and the unlocked state where charging cable 400 can be removed from inlet 220.

Specifically, connector lock mechanism 260 includes a lock bar 262 that slides in the vertical direction, and an electromagnetic actuator 261 that causes lock bar 262 to slide. Pressing force detection sensor 263 is provided at the lower end of lock bar 262.

Figure 3:
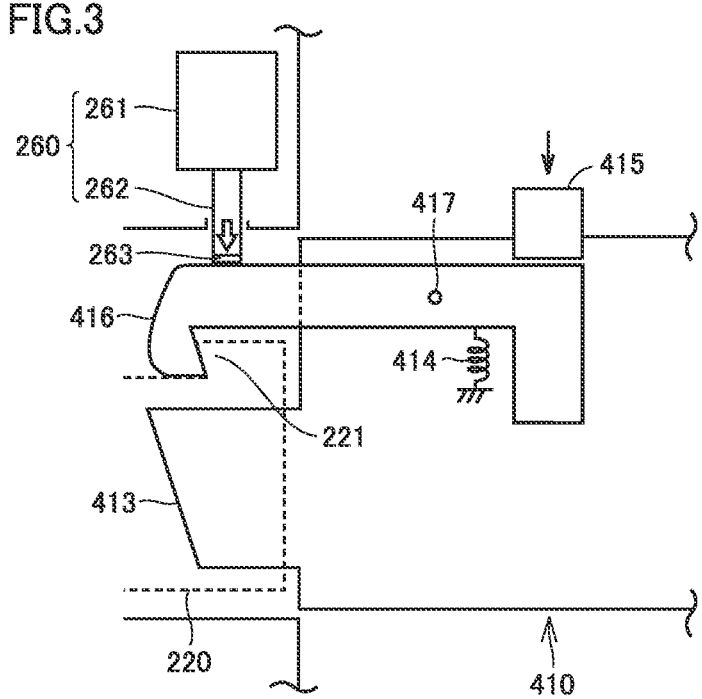
FIG. 3 is a cross-sectional view of the inlet and a charging connector in the locked state of a connector lock mechanism.
Figure 4:
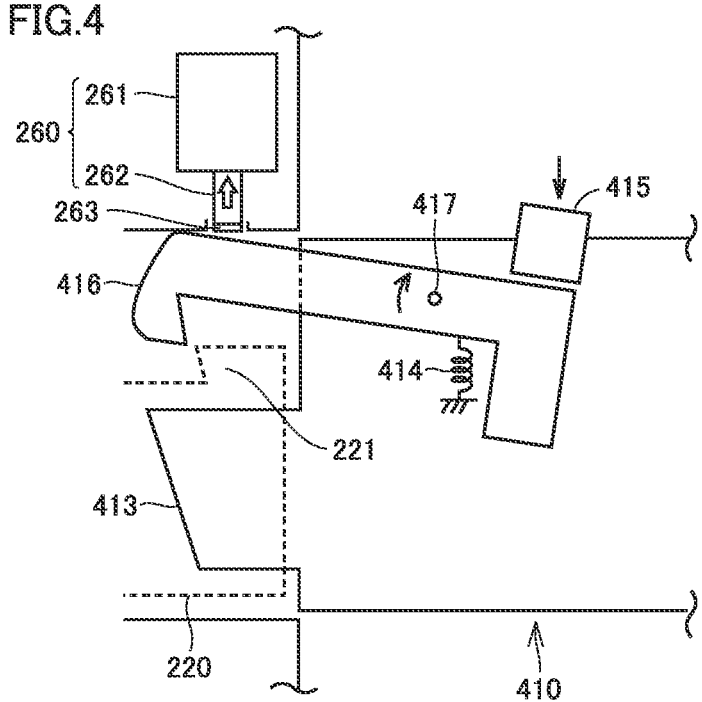
FIG. 4 is a cross-sectional view of the inlet and the charging connector in the unlocked state of the connector lock mechanism.

FIG. 3 is a cross-sectional view of inlet 220 and charging connector 410 in the locked state of connector lock mechanism 260. FIG. 4 is a cross-sectional view of inlet 220 and charging connector 410 in the unlocked state of connector lock mechanism 260. FIGS. 3 and 4 are cross-sectional views along III-III in FIG. 2. Referring to FIGS. 2 to 4, a mechanism for engagement and fixation between charging connector 410 and inlet 220 is described.

Charging connector 410 is provided at its tip with a connection portion 413, which is connected to inlet 220 in an electrically conductive manner. Charging connector 410 is provided with a link 416. This link 416 is attached in a manner rotatable around a shaft 417. Link 416 has one end provided with a convex portion to engage with a protrusion 221 of inlet 220, and the other end provided with a push button 415. Link 416 is elastically biased by a spring 414 with respect to the body of charging connector 410 (see FIGS. 3 and 4). When charging connector 410 and inlet 220 are electrically connected, a connection signal (proximity detection signal) PISW indicating an electrically connected state of charging cable 400 is transmitted to ECU 300 via inlet 220. Upon receiving the PISW, ECU 300 determines that charging connector 410 and inlet 220 are now electrically connected.

In FIG. 3, when inserted into inlet 220, charging connector 410 is electrically connected, and the convex portion of link 416 engages with protrusion 221 of inlet 220 (hereinafter also referred to as "engaged state," "latched state"). This prevents charging connector 410 from being disconnected from inlet 220. A combination of the convex portion of link 416 and protrusion 221 of inlet 220 is referred to as latch mechanism. The convex portion of link 416 is the latch mechanism on the charging cable 400 side. Protrusion 221 of inlet 220 is the latch mechanism on the vehicle 100 side.

In the locked state of connector lock mechanism 260, lock bar 262 is slid downward and fixed at a position where lock bar 262 comes into contact with the upper surface of link 416. As a result, even if push button 415 is pressed, the rotation of link 416 is suppressed by lock bar 262, and the convex portion of link 416 no longer rises to be removed from protrusion 221 of inlet 220. That is, even if push button 415 is pressed by the user, charging connector 410 can no longer be removed from inlet 220.

When charging connector 410 and inlet 220 engage with each other and enter the locked state, pressing force detection sensor 263 is moved together with the lower end of lock bar 262 to a position where pressing force detection sensor 263 prevents the convex portion of link 416 from moving out of the engagement. At this time, pressing force detection sensor 263 is brought into abutment with and pressed onto the upper surface side of link 416. The pressing force applied to pressing force detection sensor 263 is converted into an electrical signal and sent to ECU 300. ECU 300 determines the locked state when the pressing force applied to pressing force detection sensor 263 is higher than or equal to a prescribed value. ECU 300 determines the unlocked state when the pressing force applied to pressing force detection sensor 263 is lower than the prescribed value.

In FIG. 4, in the unlocked state, lock bar 262 is slid upward and fixed at a position where lock bar 262 does not suppress the rotation of link 416. Since lock bar 262 thus no longer suppresses the rotation of link 416, pressing push button 415 causes link 416 to rotate around shaft 417 and the convex portion provided at the other end to rise. As a result, the convex portion of link 416 is removed from protrusion 221 of inlet 220, thus allowing the removal of charging connector 410 from inlet 220. That is, pressing push button 415 by the user allows the removal of charging cable 400 from inlet 220.

When ECU 300 detects an operation of connector lock switch 177, ECU 300 accepts the operation of connector lock switch 177. Upon accepting the operation of connector lock switch 177, ECU 300 outputs a lock command when connector lock mechanism 260 is in the unlocked state, and an unlock command when connector lock mechanism 260 is in the locked state, to actuator 261.

Figure 5:
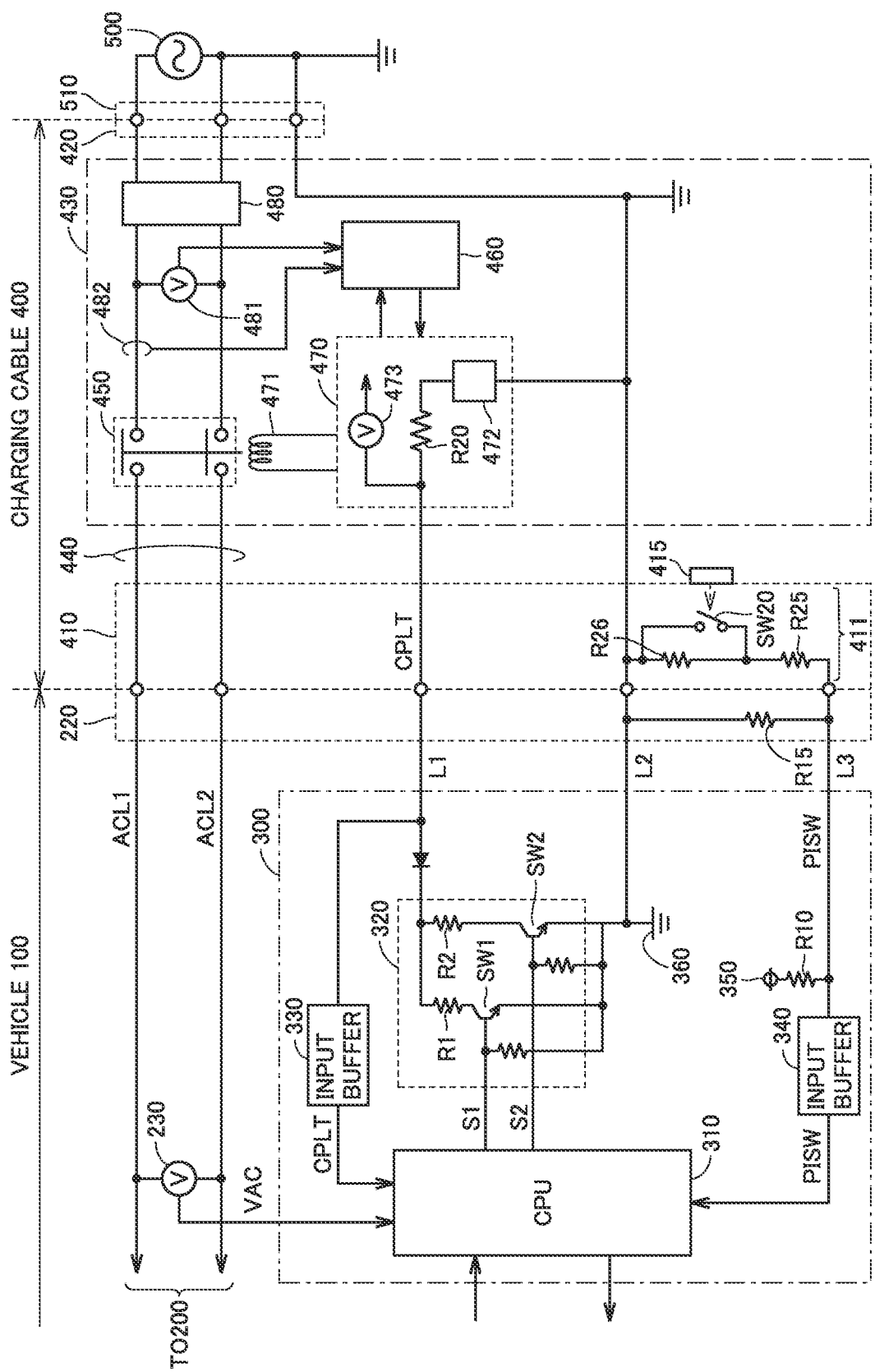
FIG. 5 shows an overview of a circuit related to external charging in the present embodiment.

FIG. 5 shows an overview of a circuit related to the external charging in the present embodiment. Referring to FIG. 5, CCID 430 includes a CCID relay 450, a CCID controller 460, a control pilot circuit 470, an electromagnetic coil 471, a leakage detector 480, a voltage sensor 481, and a current sensor 482. Control pilot circuit 470 includes an oscillation circuit 472, a resistor R20, and a voltage sensor 473.

CCID relay 450 is inserted in cable portion 440 in charging cable 400. CCID relay 450 is controlled by control pilot circuit 470. When CCID relay 450 is opened, an electrical path is interrupted in charging cable 400. When CCID relay 450 is closed, on the other hand, electric power is supplied from external power supply 500 to vehicle 100.

Control pilot circuit 470 outputs pilot signal CPLT to ECU 300 through charging connector 410 and inlet 220. This pilot signal CPLT is a signal for notifying ECU 300 of a rated current of charging cable 400 from control pilot circuit 470. Pilot signal CPLT is also used as a signal for remotely controlling CCID relay 450 from ECU 300 based on a potential of pilot signal CPLT controlled by ECU 300. Control pilot circuit 470 controls CCID relay 450 based on potential variation in pilot signal CPLT.

Pilot signal CPLT and connection signal PISW, and the configurations such as the shapes and the terminal arrangement of inlet 220 and connector 410 described above are standardized, for example, by the SAE (Society of Automotive Engineers) of the United States, the Japan Electric Vehicle Association, and the like.

CCID controller 460 includes a CPU, a storage device, and an input/output buffer, none of which are shown. CCID controller 460 inputs and outputs signals to and from the various sensors and control pilot circuit 470, and controls the charging operation of charging cable 400.

When the potential of pilot signal CPLT detected by voltage sensor 473 is a defined potential (for example, 12 V), oscillation circuit 472 outputs a non-oscillating signal. When the potential of pilot signal CPLT decreases from the defined potential (for example, 9 V), oscillation circuit 472 is controlled by CCID controller 460 to output a signal oscillating at defined frequency (for example, 1 kHz) and duty cycle.

The potential of pilot signal CPLT is controlled by ECU 300. The duty cycle is set based on the rated current that can be supplied from external power supply 500 to vehicle 100 through charging cable 400.

As described above, when the potential of pilot signal CPLT decreases from the defined potential, pilot signal CPLT oscillates in a defined cycle. A pulse width of pilot signal CPLT is set based on the rated current that can be supplied from external power supply 500 to vehicle 100 through charging cable 400. That is, by a duty represented by a ratio of the pulse width to the oscillation cycle, control pilot circuit 470 notifies ECU 300 of vehicle 100 of the rated current by using pilot signal CPLT.

The rated current is determined for each charging cable, and varies with the type of charging cable 400. Accordingly, the duty of pilot signal CPLT also varies with each charging cable 400.

Based on the duty of pilot signal CPLT received through a control pilot line L1, ECU 300 can detect the rated current that can be supplied to vehicle 100 through charging cable 400.

When the potential of pilot signal CPLT is further reduced (for example, 6 V) by ECU 300, control pilot circuit 470 supplies a current to electromagnetic coil 471. In response to the current supply from control pilot circuit 470, electromagnetic coil 471 generates electromagnetic force, and closes the contacts of CCID relay 450 to render CCID relay 450 conducting.

Leakage detector 480 is provided in the middle of cable portion 440 of charging cable 400 in CCID 430, and detects the presence or absence of leakage. Specifically, leakage detector 480 detects a balance of currents flowing through a pair of cable portions 440 in opposite directions, and detects that leakage has occurred when the balance is disturbed. Although not particularly shown, when leakage is detected by leakage detector 480, power feeding to electromagnetic coil 471 is interrupted, and the contacts of CCID relay 450 are opened to render CCID relay 450 non-conducting.

When plug 420 of charging cable 400 is inserted into outlet 510, voltage sensor 481 detects a power supply voltage transmitted from external power supply 500, and notifies CCID controller 460 of the detected value. Current sensor 482 detects a current flowing through cable portion 440, and notifies CCID controller 460 of the detected value.

Charging connector 410 includes a connection detection circuit 411 including resistors R25, R26 and a switch SW20. Resistors R25, R26 are connected in series between a connection signal line L3 and a ground line L2. Switch SW20 is connected in parallel with resistor R26.

Switch SW20 is a limit switch, for example, whose contacts are closed when charging connector 410 is reliably fitted in inlet 220. The contacts of switch SW20 are opened when charging connector 410 is disconnected from inlet 220, and when charging connector 410 is unreliably fitted in inlet 220. The contacts of switch SW20 are also opened upon operation of push button 415 provided on charging connector 410 and operated by the user for removing charging connector 410 from inlet 220.

When charging connector 410 is disconnected from inlet 220, a voltage signal determined by a voltage of a power supply node 350 and a pull-up resistor R10 included in ECU 300, and by a resistor R15 provided in inlet 220, is generated as connection signal PISW on connection signal line L3. When charging connector 410 is connected to inlet 220, a voltage signal in accordance with combined resistance by a combination of resistors R15, R25, R26 is generated on connection signal line L3, depending on the fitted state, the operated state of push button 415, and the like.

ECU 300 can determine the connected state and the fitted state of charging connector 410 by detecting a potential of connection signal line L3 (that is, a potential of connection signal PISW).

In vehicle 100, ECU 300 includes, in addition to power supply node 350 and pull-up resistor R10 described above, the CPU 310, a resistor circuit 320, and input buffers 330, 340.

Resistor circuit 320 includes pull-down resistors R1, R2, and switches SW1, SW2. Pull-down resistor R1 and switch SW1 are connected in series between control pilot line L1 through which pilot signal CPLT is communicated and a vehicle ground 360. Pull-down resistor R2 and switch SW2 are also connected in series between control pilot line L1 and vehicle ground 360. Switches SW1, SW2 are controlled to be conducting or non-conducting in accordance with control signals S1, S2 from CPU 310, respectively.

This resistor circuit 320 is a circuit for controlling the potential of pilot signal CPLT from the vehicle 100 side.

Input buffer 330 receives pilot signal CPLT on control pilot line L1, and outputs received pilot signal CPLT to CPU 310. Input buffer 340 receives connection signal PISW from connection signal line L3 connected to connection detection circuit 411 of charging connector 410, and outputs received connection signal PISW to CPU 310. A voltage is applied to connection signal line L3 from ECU 300 as described above, and the potential of connection signal PISW varies when charging connector 410 is connected to inlet 220. CPU 310 detects the connected state and the fitted state of charging connector 410 by detecting this potential of connection signal PISW.

CPU 310 receives pilot signal CPLT and connection signal PISW from input buffers 330, 340, respectively. CPU 310 detects the connected state and the fitted state of charging connector 410 by detecting the potential of connection signal PISW. CPU 310 also detects the rated current of charging cable 400 by detecting the oscillation state and duty cycle of pilot signal CPLT.

CPU 310 then controls the potential of pilot signal CPLT by controlling control signals S1, S2 for switches SW1, SW2 based on the potential of connection signal PISW and the oscillation state of pilot signal CPLT. CPU 310 can thus remotely control CCID relay 450. Electric power is then transmitted from external power supply 500 to vehicle 100 through charging cable 400.

CPU 310 receives a voltage VAC, which is supplied from external power supply 500 and detected by a voltage sensor 230 provided between power lines ACL1 and ACL2.

Referring to FIGS. 1 and 5, when the contacts of CCID relay 450 are closed, AC power from external power supply 500 is provided to power conversion device 200, to complete preparation for charging of power storage device 110 from external power supply 500. CPU 310 outputs control signal PWD to power conversion device 200, to convert the AC power from external power supply 500 into DC power with which power storage device 110 can be charged. CPU 310 then outputs control signal SE2 to close the contacts of CHR 210, to perform charging of power storage device 110.

First Embodiment

Conventionally, external charging is stopped when charging stop switch 301 is operated by the user. If charging stop switch 301 fails while in the state where the external charging is stopped (for example, a closed failure), however, the external charging cannot be performed when so desired.

Therefore, vehicle 100 according to the present disclosure includes charging stop switch 301 that accepts a stopping operation for stopping external charging, and ECU 300 that stops the external charging when the stopping operation is accepted at charging stop switch 301. If a specific operation different from the stopping operation at charging stop switch 301 is accepted, ECU 300 disables acceptance of the stopping operation.

Accordingly, if the specific operation different from the stopping operation for stopping the external charging is accepted, acceptance of the stopping operation by charging stop switch 301 is disabled. As a result, the external charging can be performed even in the event of a failure of charging stop switch 301 that accepts the stopping operation for stopping the external charging.

Figure 6:
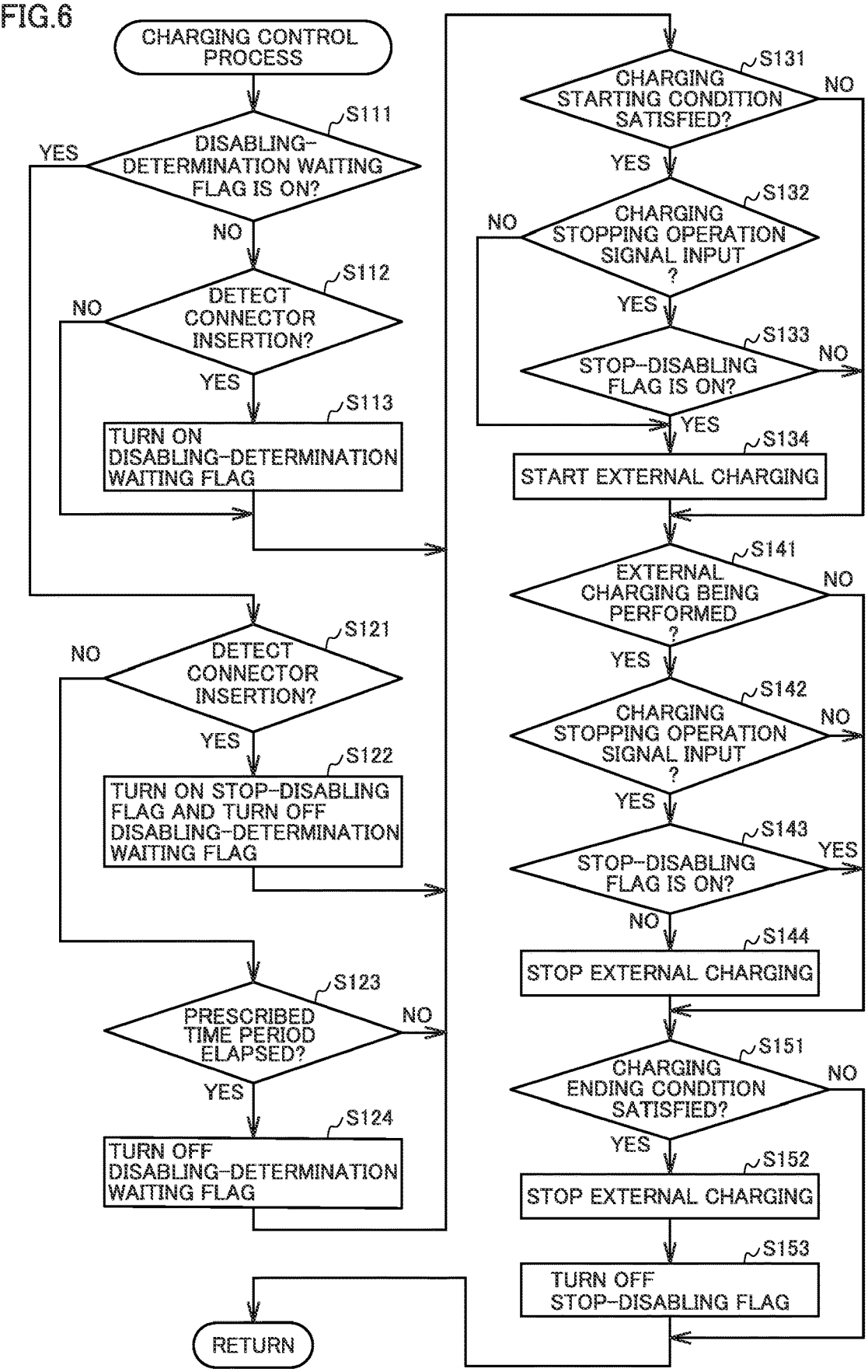
FIG. 6 is a flowchart showing a flow of a charging control process in the present embodiment.

Control in the present embodiment is described below. FIG. 6 is a flowchart showing a flow of a charging control process in the present embodiment. This charging control process is invoked from a higher process at regular intervals and executed by CPU 310 of ECU 300.

Referring to FIG. 6, CPU 310 determines whether or not a disabling-determination waiting flag is ON (step S111). The disabling-determination waiting flag is a flag indicating whether or not waiting is being performed for a determination to disable the stopping operation by charging stop switch 301. Specifically, it is a flag indicating whether or not waiting is being performed for determinations of whether an intended operation of a prescribed subject has been performed, and whether a specific operation different from the intended operation has been performed.

When it is determined that the disabling-determination waiting flag is not ON (NO in step S111), that is, that the flag is OFF, CPU 310 determines whether or not the insertion of charging connector 410 into inlet 220 has been detected (step S112). As was described in FIG. 5, CPU 310 can determine the fitted state of charging connector 410 by detecting the potential of connection signal line L3, that is, the potential of connection signal PISW.

When it is determined that the insertion of charging connector 410 has been detected (YES in step S112), CPU 310 turns on the disabling-determination waiting flag (step S113). When it is determined that the insertion of charging connector 410 has not been detected (NO in step S112), and after step S113, CPU 310 moves the execution process to step S131.

When it is determined that the disabling-determination waiting flag is ON (YES in step S111), CPU 310 determines whether or not the insertion of charging connector 410 into inlet 220 has been detected in a manner similar to step S112 (step S121).

When it is determined that the insertion of charging connector 410 has been detected (YES in step S121), CPU 310 turns on a stop-disabling flag and turns off the disabling-determination waiting flag (step S122), and moves the execution process to step S131. The stop-disabling flag is a flag indicating whether or not the stopping operation by charging stop switch 301 has been disabled. Specifically, it is a flag indicating whether or not a specific operation different from the intended operation of the prescribed subject has been performed.

When it is determined that the insertion of charging connector 410 has not been detected (NO in step S121), on the other hand, CPU 310 determines whether or not a prescribed time period (for example, prescribed seconds from about 2, 3 seconds to about 10 seconds) has elapsed since the disabling-determination waiting flag was turned on (step S123). When it is determined that the prescribed time period has elapsed (YES in step S123), CPU 310 turns off the disabling-determination waiting flag (step S124). When it is determined that the prescribed time period has not elapsed (NO in step S123), and after step S124, CPU 310 moves the execution process to step S131.

When the process is moved to step S131, CPU 310 determines whether or not a charging starting condition has been satisfied (step S131). The charging starting condition is a condition that allows the external charging to be started. The charging starting condition is satisfied when, for example, the SOC of power storage device 110 is lower than a prescribed upper limit value, plug 420 is connected to outlet 510 of external power supply 500, and charging connector 410 is inserted into inlet 220. For fast charging, the charging starting condition is satisfied when, additionally, a fast charger for starting the external charging is operated by the user.

When it is determined that the charging starting condition has been satisfied (YES in step S131), CPU 310 determines whether or not charging stopping operation signal STP has been input from charging stop switch 301 (step S132). Charging stopping operation signal STP is input while charging stop switch 301 is pressed by the user, and continues to be input while a closed failure is occurring in charging stop switch 301.

When it is determined that charging stopping operation signal STP has been input (YES in step S132), CPU 310 determines whether or not the stop-disabling flag is ON (step S133).

When it is determined that charging stopping operation signal STP has not been input (NO in step S132), and when charging stopping operation signal STP has been input but it is determined that the stop-disabling flag is ON (YES in step S133), CPU 310 performs control to start the external charging (step S134).

When it is determined that the charging starting condition has been satisfied (YES in step S131), and it is determined that the charging stopping operation signal has been input (YES in step S132), on the other hand, when it is determined that the stop-disabling flag is not ON (NO in step S133), that is, that the stop-disabling flag is OFF, the external charging is not started.

When it is determined that the charging starting condition has not been satisfied (NO in step S131), when it is determined that the stop-disabling flag is not ON (NO in step S133), and after step S134, CPU 310 determines whether or not the external charging is being performed (step S141).

When it is determined that the external charging is being performed (YES in step S141), CPU 310 determines whether or not charging stopping operation signal STP has been input from charging stop switch 301 in a manner similar to step S132 (step S142).

When it is determined that charging stopping operation signal STP has been input (YES in step S142), CPU 310 determines whether or not the stop-disabling flag is ON (step S143).

When it is determined that the stop-disabling flag is not ON (NO in step S143), that is, that the stop-disabling flag is OFF, CPU 310 performs control to stop the external charging (step S144).

When it is determined that the external charging is being performed (YES in step S141), and it is determined that charging stopping operation signal STP has been input (YES in step S142), but when it is determined that the stop-disabling flag is ON (YES in step S143), on the other hand, the process is not moved to step S144 and the external charging is continued.

When it is determined that the external charging is not being performed (NO in step S141), when it is determined that charging stopping operation signal STP has not been input (NO in step S142), when it is determined that the stop-disabling flag is ON (YES in step S143), and after step S144, CPU 310 determines whether or not a charging ending condition has been satisfied (step S151). The charging ending condition is a condition that ends the external charging. The charging ending condition is satisfied when, for example, the SOC of power storage device 110 reaches the prescribed upper limit value.

When it is determined that the charging ending condition has been satisfied (YES in step S151), CPU 310 performs control to stop the external charging (step S152), and turns off the stop-disabling flag (step S153).

When it is determined that the charging ending condition has not been satisfied (NO in step S151), and after step S153, CPU 310 returns the execution process to the higher process from which this charging control process was invoked.

In this manner, in the first embodiment, when it is determined that the prescribed number of operations of connecting and disconnecting charging connector 410 to and from inlet 220 within the prescribed time period has been accepted, ECU 300 disables acceptance of the stopping operation for stopping the external charging.

Second Embodiment

In the first embodiment, when the insertion of charging connector 410 into inlet 220 is detected a plurality of times (twice in the first embodiment) within the prescribed time period (in other words, when the insertion, removal and insertion of charging connector 410 is successively carried out within the prescribed time period), the operation of stopping the charging by charging stop switch 301 is disabled.

In a second embodiment, when the operation of push button 415 of charging connector 410 for releasing the latched state is detected a plurality of times (twice in the second embodiment) within the prescribed time period, the operation of stopping the charging by charging stop switch 301 is disabled.

Figure 7:
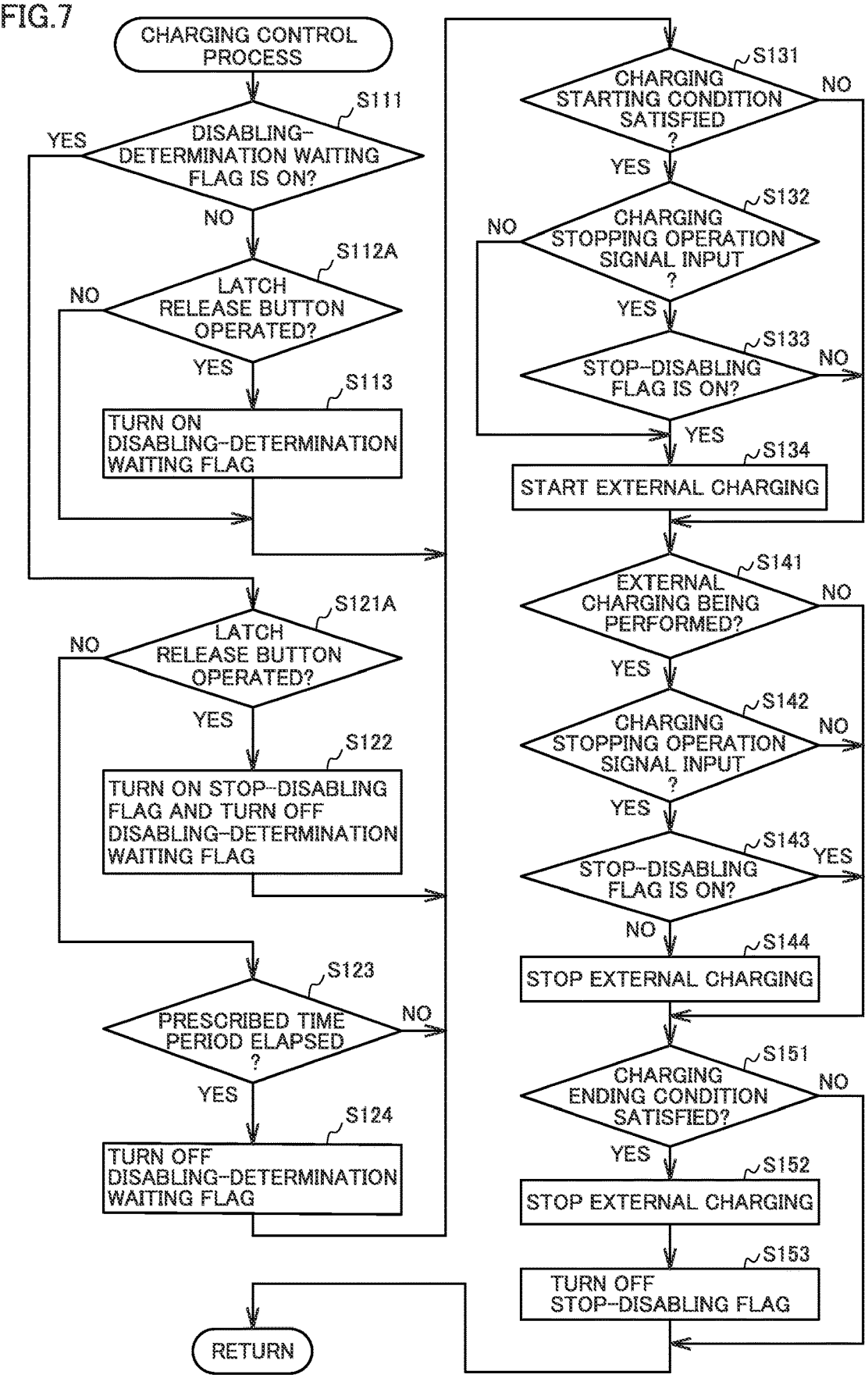
FIG. 7 is a flowchart showing a flow of a charging control process in a second embodiment.

FIG. 7 is a flowchart showing a flow of a charging control process in the second embodiment. Referring to FIG. 7, the charging control process in FIG. 7 includes step S112A and step S121A in place of step S112 and step S121 of the charging control process in the first embodiment described in FIG. 6, respectively.

In step S112A and step S121A, CPU 310 determines whether or not the pressing down of push button 415 for releasing the latched state of charging connector 410 has been detected. As was described in FIG. 5, CPU 310 detects whether or not push button 415 has been pressed down by detecting the potential of connection signal line L3 that varies with the operated state of push button 415, that is, the potential of connection signal PISW, by input buffer 340.

In this manner, in the second embodiment, when it is determined that the prescribed number of releasing operations of push button 415 within the prescribed time period has been accepted, ECU 300 disables acceptance of the stopping operation for stopping the external charging.

Third Embodiment

In a third embodiment, when the locking operation of connector lock switch 177 for locking connector lock mechanism 260 is detected a plurality of times (twice in the third embodiment) within the prescribed time period (in other words, when the locking operation, unlocking operation and locking operation of connector lock switch 177 is successively carried out within the prescribed time period), the operation of stopping the charging by charging stop switch 301 is disabled.

Figure 8:
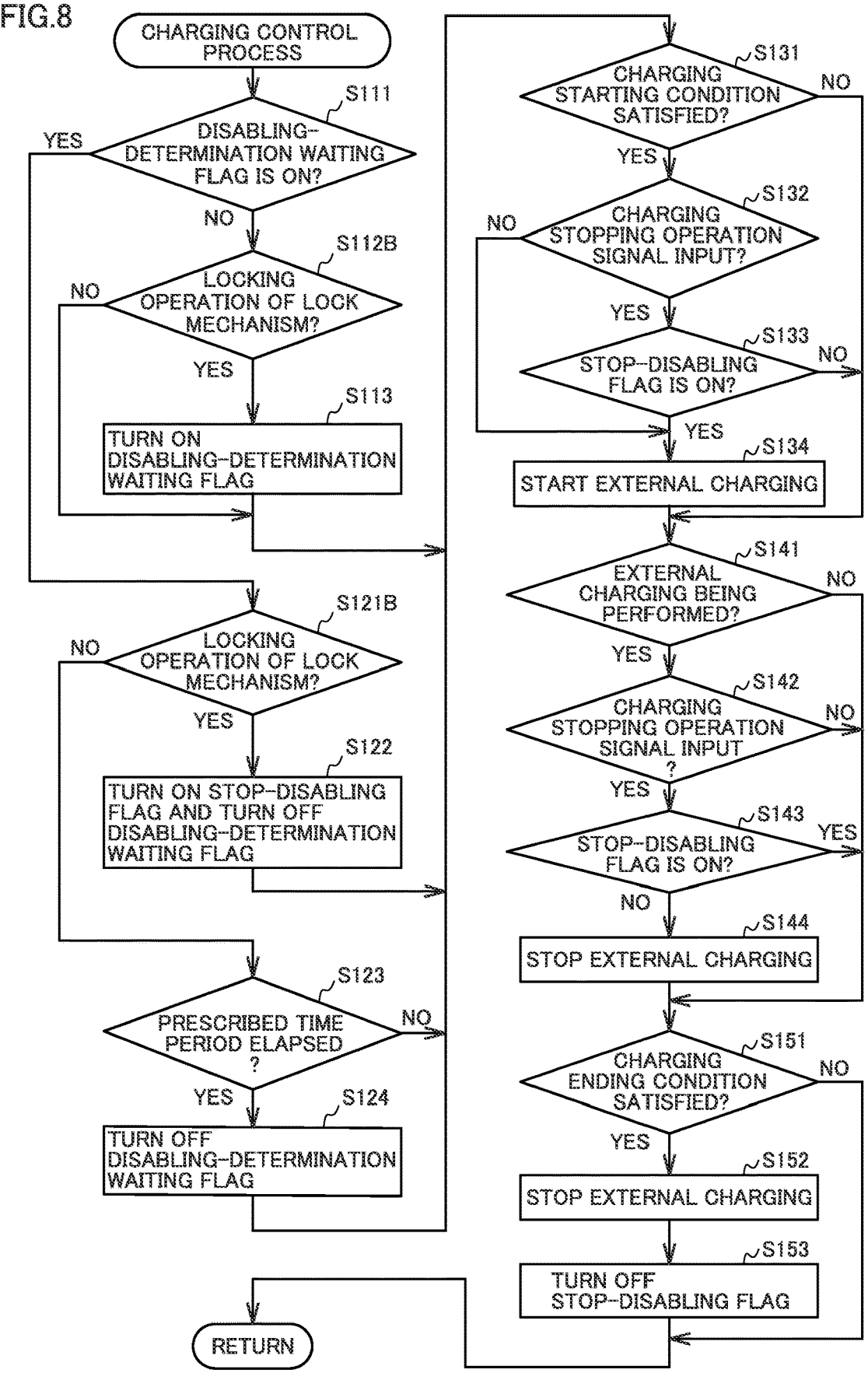
FIG. 8 is a flowchart showing a flow of a charging control process in a third embodiment.

FIG. 8 is a flowchart showing a flow of a charging control process in the third embodiment. Referring to FIG. 8, the charging control process in FIG. 8 includes step S112B and step S121B in place of step S112 and step S121 of the charging control process in the first embodiment described in FIG. 6, respectively.

In step S112B and step S121B, CPU 310 determines whether or not the locking operation of connector lock switch 177 for locking or unlocking charging connector 410 by connector lock mechanism 260 has been detected. As was described in FIGS. 1 and 2, the operation signal is input to CPU 310 every time connector lock switch 177 is pressed down. The operation signal from connector lock switch 177 that is input for the first time since the insertion of charging connector 410 into inlet 220 is an operation signal for locking connector lock mechanism 260.

In this manner, in the third embodiment, when it is determined that the prescribed number of switching operations of connector lock switch 177 within the prescribed time period has been accepted, ECU 300 disables acceptance of the stopping operation for stopping the external charging.

[Variations]

(1) In the embodiments described above, vehicle 100 is a plug-in hybrid vehicle. However, without being limited as such, vehicle 100 may be any vehicle capable of external charging in which vehicle-mounted power storage device 110 is externally charged, for example, an electric vehicle and a fuel cell vehicle.

(2) In the embodiments described above, when it is determined that the specific operation different from the intended operation of the prescribed subject has been accepted, acceptance of the stopping operation for stopping the external charging is disabled.

Specifically, in the first embodiment, the prescribed subject is charging connector 410. The intended operation of the prescribed subject is the insertion of charging connector 410 into inlet 220 in a normal fashion (specifically, a single insertion within the prescribed time period). The specific operation is the insertion of charging connector 410 into inlet 220 in a specific fashion (specifically, a plurality of insertions within the prescribed time period) as was shown in FIG. 6.

In the second embodiment, the prescribed subject is push button 415 of charging connector 410 for releasing the latched state. The intended operation of the prescribed subject is the operation of push button 415 in a normal fashion (specifically, a single operation within the prescribed time period). The specific operation is the operation of push button 415 in a specific fashion (specifically, a plurality of operations within the prescribed time period) as was shown in FIG. 7.

In the third embodiment, the prescribed subject is connector lock switch 177 for locking or unlocking charging connector 410 by connector lock mechanism 260. The intended operation of the prescribed subject is the operation of connector lock switch 177 in a normal fashion (specifically, a single operation within the prescribed time period). The specific operation is the operation of connector lock switch 177 in a specific fashion (specifically, a plurality of locking operations within the prescribed time period) as was shown in FIG. 8.

However, without being limited as such, the prescribed subject and the specific operation may be another prescribed subject and another specific operation, respectively. For example, the prescribed subject may be charging lid 222, and the specific operation may be an operation of charging lid 222 in a specific fashion (for example, a plurality of opening operations within the prescribed time period). The intended operation of charging lid 222 is a single opening operation within the prescribed time period.

(3) In the embodiments described above, when it is determined that the specific operation has been accepted, the stop-disabling flag is turned on by the process shown in step S122 of FIGS. 6 to 8, so that acceptance of the operation of stopping the external charging is disabled by software. However, without being limited as such, a switching circuit capable of switching between a state where charging stopping operation signal STP can be input to CPU 310 and a state where the signal cannot be input to CPU 310 may be provided, and when the specific operation is accepted, the switching circuit may be switched to the state where the signal cannot be input, so that acceptance of the operation of stopping the external charging is disabled by hardware.

(4) In the embodiments described above, the specific operation is an operation different from the intended operation of the prescribed subject, as was shown in FIGS. 6 to 8. However, without being limited as such, the prescribed subject may be a component provided in vehicle 100 beforehand, or a component provided in vehicle 100 for accepting the specific operation (in this case, the specific operation is the intended operation of the prescribed subject). The specific operation may not be the operation of the prescribed subject, or may be any other operation that can be detected by vehicle 100.

In the embodiments described above, ECU 300 determines whether or not the specific operation different from the stopping operation at charging stop switch 301 has been accepted, as was shown in step S112, step S121, step S112A, step S121A, step S112B, step S121B in FIGS. 6 to 8.

However, without being limited as such, a specific operation determination unit that determines whether or not a specific operation different from the stopping operation has been accepted may be provided separately from ECU 300. In this case, the specific operation determination unit transmits to ECU 300 information indicating a result of the determination of whether or not the specific operation has been accepted. ECU 300 can be regarded as including the specific operation determination unit in the first embodiment to the third embodiment described above.

Figure 9:
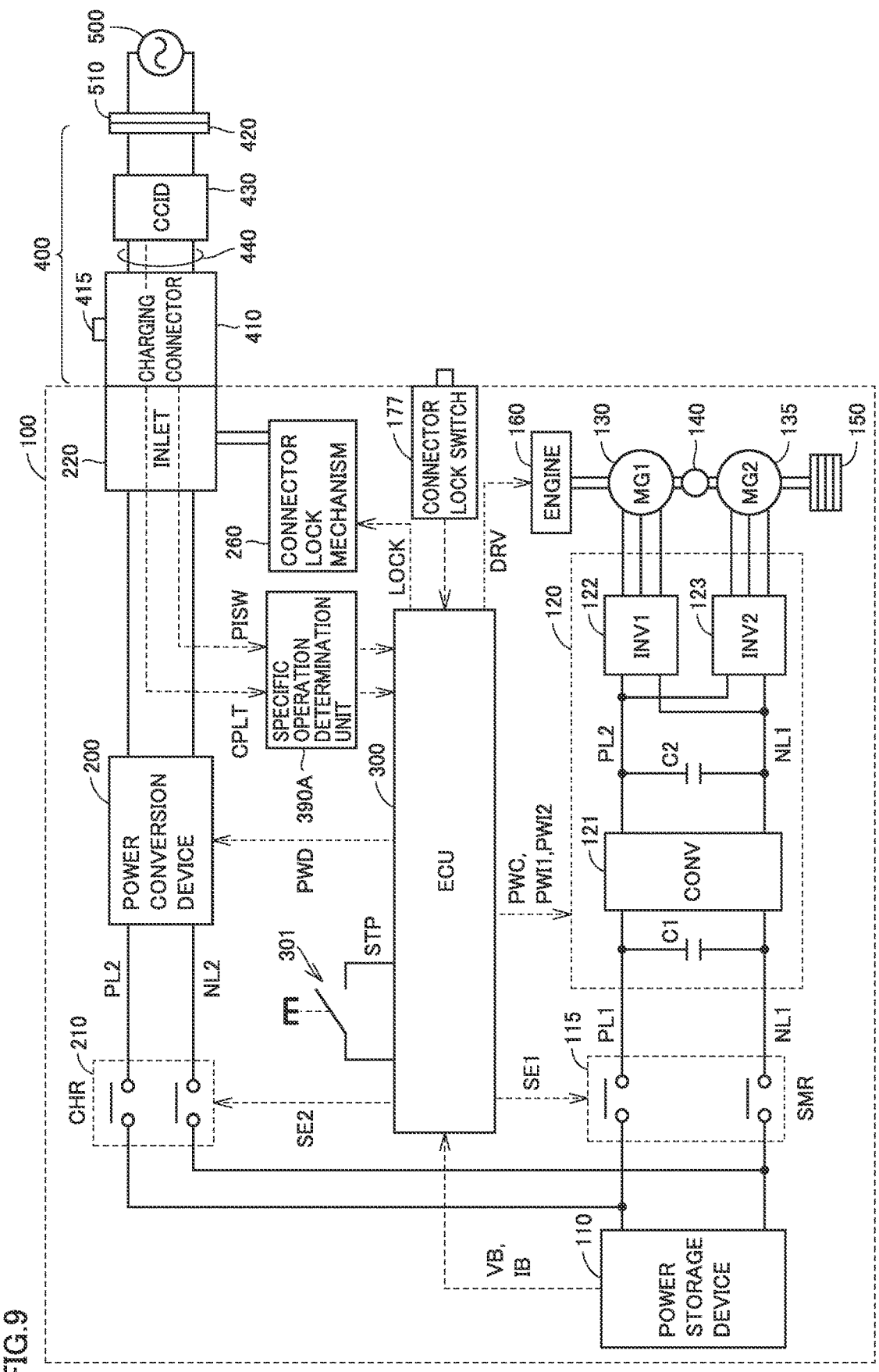
FIG. 9 is a first overall block diagram of the externally chargeable vehicle in a variation.

FIG. 9 is a first overall block diagram of the externally chargeable vehicle in a variation. Referring to FIG. 9, in the first embodiment, a specific operation determination unit 390A determines the fitted state of charging connector 410 by detecting the potential of connection signal PISW, determines that the specific operation has been accepted when the insertion of charging connector 410 is detected a plurality of times, and transmits to ECU 300 a signal indicating a result of the determination of whether or not the specific operation has been accepted.

Referring back to FIG. 9, in the second embodiment, specific operation determination unit 390A determines whether or not push button 415 has been pressed down by detecting the potential of connection signal PISW, determines that the specific operation has been accepted when a prescribed number of releasing operations of push button 415 within the prescribed time period has been accepted, and transmits to ECU 300 a signal indicating a result of the determination of whether or not the specific operation has been accepted.

Figure 10:
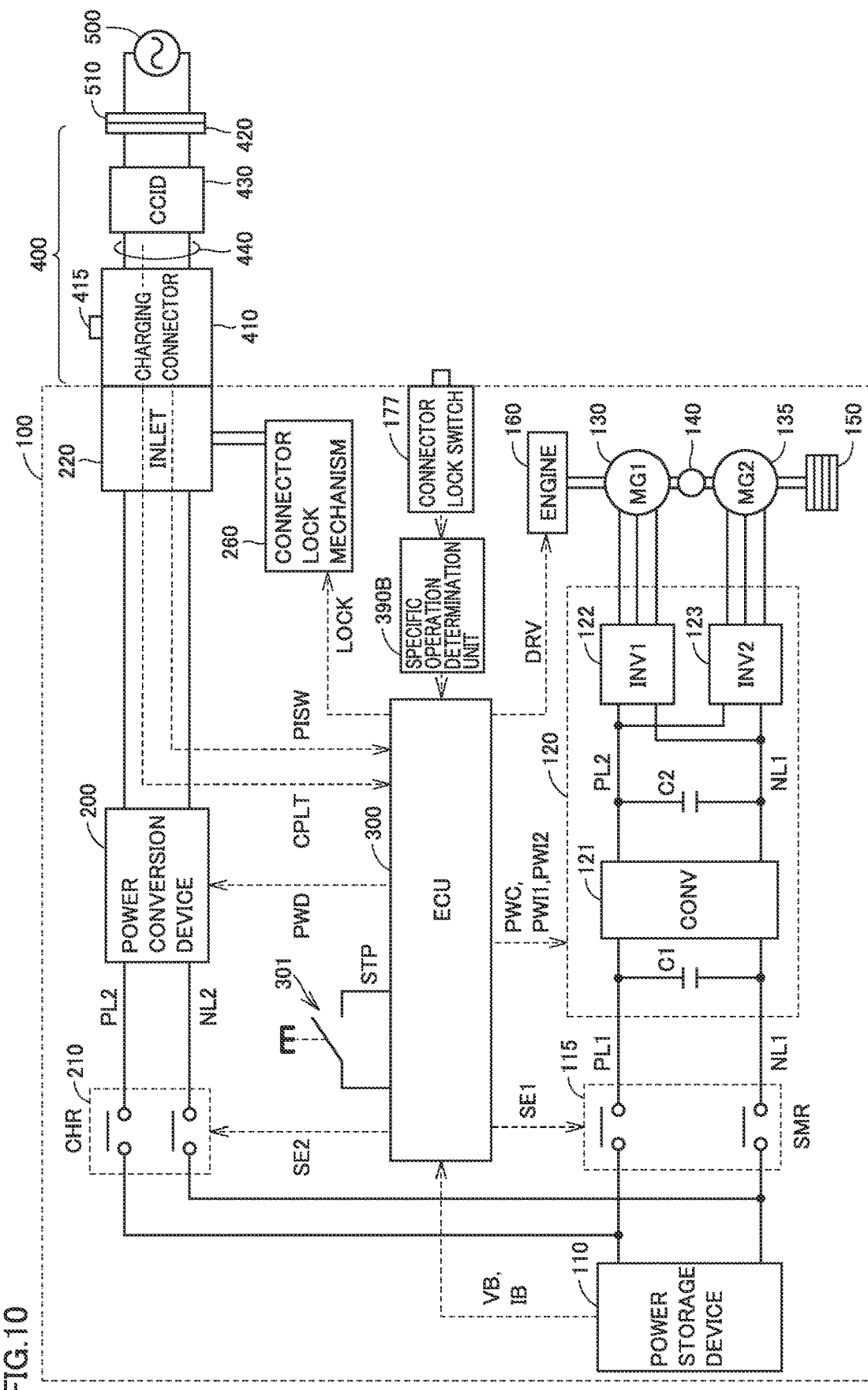
FIG. 10 is a second overall block diagram of the externally chargeable vehicle in a variation.

FIG. 10 is a second overall block diagram of the externally chargeable vehicle in a variation. Referring to FIG. 10, in the third embodiment, a specific operation determination unit 390B determines that the specific operation has been accepted when the locking operation of connector lock switch 177 for locking connector lock mechanism 260 has been detected a plurality of times within the prescribed time period, and transmits to ECU 300 a signal indicating a result of the determination of whether or not the specific operation has been accepted.

CONCLUSION (1) As was shown in FIGS. 1 to 5, vehicle 100 includes charging stop switch 301 that accepts the stopping operation for stopping the external charging, and ECU 300 that stops the external charging when the stopping operation is accepted at charging stop switch 301. As was shown in FIGS. 6 to 8, ECU 300 determines whether or not the specific operation different from the stopping operation at charging stop switch 301 has been accepted (step S112, step S121, step S112A, step S121A, step S112B, step S121B), and when it is determined that that the specific operation has been accepted, disables acceptance of the stopping operation (step S122).

Accordingly, when it is determined that the specific operation different from the stopping operation for stopping the external charging has been accepted, acceptance of the stopping operation by charging stop switch 301 is disabled. As a result, the external charging can be performed even in the event of a failure of charging stop switch 301 that accepts the stopping operation for stopping the external charging.

(2) As was shown in FIGS. 6 to 8, the specific operation is an operation different from the intended operation of the prescribed subject. Accordingly, when it is determined that the specific operation different from the intended operation of the prescribed subject has been accepted, acceptance of the stopping operation by charging stop switch 301 is disabled. Thus, the specific operation can be accepted as an operation of a prescribed subject already provided in the vehicle. As a result, the specific operation can be accepted without the need to provide a special component.

(3) As was shown in FIGS. 1 to 5, vehicle 100 includes inlet 220 to which charging connector 410 for external charging can be connected. As was shown in FIG. 6, ECU 300 detects the connection of charging connector 410 to inlet 220 (step S112, step S121), the prescribed subject is charging connector 410, and the specific operation is the prescribed number of operations of connecting and disconnecting the prescribed subject within the prescribed time period.

Accordingly, when it is determined that the prescribed number of operations of connecting and disconnecting charging connector 410 within the prescribed time period has been accepted as the specific operation, acceptance of the stopping operation by charging stop switch 301 is disabled. Thus, the specific operation can be accepted as an operation of charging connector 410 already provided in vehicle 100. As a result, the specific operation can be accepted without the need to provide a special component.

(4) As was shown in FIGS. 1 to 5, vehicle 100 further includes inlet 220 to which charging connector 410 for external charging can be connected, the latch mechanism (the combination of the convex portion of link 416 and protrusion 221 of inlet 220) that achieves the latched state where charging connector 410 connected to inlet 220 is not removed, and push button 415 that accepts the releasing operation for releasing the latched state by the latch mechanism. As was shown in FIG. 7, the prescribed subject is push button 415, and the specific operation is the prescribed number of releasing operations of the prescribed subject within the prescribed time period.

Accordingly, when it is determined that the prescribed number of releasing operations of push button 415 within the prescribed time period has been accepted as the specific operation, acceptance of the stopping operation by charging stop switch 301 is disabled. Thus, the specific operation can be accepted as an operation of push button 415 already provided in vehicle 100. As a result, the specific operation can be accepted without the need to provide a special component.

(5) As was shown in FIGS. 1 to 5, vehicle 100 further includes inlet 220 to which charging connector 410 for external charging can be connected, connector lock mechanism 260 that switches between the locked state where charging connector 410 connected to inlet 220 is not removed and the unlocked state where charging connector 410 connected to inlet 220 can be removed, and connector lock switch 177 that accepts a switching operation between the locked state and the unlocked state by connector lock mechanism 260. As was shown in FIG. 8, the prescribed subject is connector lock switch 177, and the specific operation is the prescribed number of switching operations of the prescribed subject within the prescribed time period.

Accordingly, when it is determined that the prescribed number of switching operations of connector lock switch 177 within the prescribed time period has been accepted as the specific operation, acceptance of the stopping operation by charging stop switch 301 is disabled. Thus, the specific operation can be accepted as an operation of connector lock switch 177 already provided in vehicle 100. As a result, the specific operation can be accepted without the need to provide a special component.

Although the embodiments of the present disclosure have been described, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A vehicle capable of external charging in which a vehicle-mounted power storage device is externally charged, the vehicle comprising:
    a stopping operation unit that accepts a stopping operation for stopping the external charging; and
    a controller that stops the external charging when the stopping operation is accepted at the stopping operation unit, wherein
    when acceptance of the stopping operation is disabled and a predetermined condition is satisfied, the controller enables the acceptance of the stopping operation.

2. The vehicle according to claim 1, wherein
    when a specific operation different from the stopping operation is accepted, the controller disables the acceptance of the stopping operation, and
    the specific operation is an operation different from an intended operation of a prescribed subject.

3. The vehicle according to claim 2, further comprising:
    an inlet to which a charging connector for external charging can be connected; and a detector that detects connection of the charging connector to the inlet, wherein the prescribed subject is the charging connector, and the specific operation is a prescribed number of operations of connecting and disconnecting the prescribed subject within a prescribed time period.

4. The vehicle according to claim 2, further comprising:

an inlet to which a charging connector for external charging can be connected;

a latch mechanism that achieves a latched state where the charging connector connected to the inlet is not removed; and a releasing operation unit that accepts a releasing operation for releasing the latched state by the latch mechanism, wherein the prescribed subject is the releasing operation unit, and the specific operation is a prescribed number of the releasing operations of the prescribed subject within a prescribed time period.

5. The vehicle according to claim 2, further comprising:

an inlet to which a charging connector for external charging can be connected;

a lock mechanism that switches between a locked state and an unlocked state, the charging connector connected to the inlet being not removed in the locked state, and the charging connector connected to the inlet being capable of being removed in the unlocked state; and a switching operation unit that accepts a switching operation between the locked state and the unlocked state by the lock mechanism, wherein the prescribed subject is the switching operation unit, and the specific operation is a prescribed number of the switching operations of the prescribed subject within a prescribed time period.

* * * * *